(12) United States Patent
Mehran et al.

(10) Patent No.: US 11,977,398 B2
(45) Date of Patent: May 7, 2024

(54) UNMANNED AERIAL VEHICLE

(71) Applicant: BRITISH TELECOMMUNICATIONS PUBLIC LIMITED COMPANY, London (GB)

(72) Inventors: Farhad Mehran, London (GB); Richard MacKenzie, London (GB)

(73) Assignee: British Telecommunications Public Limited Company (GB)

( * ) Notice: Subject to any disclaimer, the term of this patent is extended or adjusted under 35 U.S.C. 154(b) by 0 days.

(21) Appl. No.: 18/249,099

(22) PCT Filed: Sep. 17, 2021

(86) PCT No.: PCT/EP2021/075591
§ 371 (c)(1),
(2) Date: Aug. 25, 2023

(87) PCT Pub. No.: WO2022/078707
PCT Pub. Date: Apr. 21, 2022

(65) Prior Publication Data
US 2023/0315129 A1    Oct. 5, 2023

(30) Foreign Application Priority Data

Oct. 16, 2020    (GB) .................................... 2016440

(51) Int. Cl.
*G05D 1/00*    (2006.01)
*H04W 4/02*    (2018.01)
(Continued)

(52) U.S. Cl.
CPC ........... *G05D 1/1064* (2019.05); *G05D 1/104* (2013.01); *H04W 4/023* (2013.01); *H04W 4/025* (2013.01); *H04W 4/40* (2018.02); *H04W 64/003* (2013.01)

(58) Field of Classification Search
CPC .... G05D 1/1064; G05D 1/104; G05D 1/0088; H04W 4/023; H04W 4/025; H04W 4/40;
(Continued)

(56) References Cited

U.S. PATENT DOCUMENTS 2,541,236 A    2/1951 Philip
2014/0222248 A1*    8/2014 Levien .................. G05D 1/104
701/2

(Continued)

FOREIGN PATENT DOCUMENTS

CN    103685325 A    3/2014
CN    111284447 A    6/2020
(Continued)

OTHER PUBLICATIONS

Hu et al., X. Risk Assessment Model for UAV Cost-Effective Path Planning in Urban Environments, IEEE Access, vol. 8, pp. 150162-150173. (Year: 2020).*

(Continued)

*Primary Examiner* — Russell Frejd
(74) *Attorney, Agent, or Firm* — Pranger Law PC (57) ABSTRACT

Operating a network node to control a first Unmanned Aerial Vehicle (UAV) in a wireless telecommunications network can include determining a collision risk for the first UAV; determining a reporting rate for the first UAV based on the collision risk; and sending a reporting rate update message to the first UAV so as to cause the first UAV to report its position at the determined reporting rate. A method of operating an Unmanned Aerial Vehicle (UAV) in a wireless telecommunications network is also disclosed.

10 Claims, 5 Drawing Sheets

(51) Int. Cl.
*H04W 4/40* (2018.01)
*H04W 64/00* (2009.01)

(58) Field of Classification Search
CPC ..... H04W 4/02; H04W 64/003; G01S 5/0018; G08G 5/0013; G08G 5/0026; G08G 5/0043; G08G 5/0069; G08G 5/0082; G08G 5/0091; G08G 5/045; H04B 7/18506

See application file for complete search history.

(56) References Cited

U.S. PATENT DOCUMENTS

| | | | |
|---|---|---|---|
| 2015/0121161 | A1 | 4/2015 | Cousins |
| 2016/0247330 | A1 | 8/2016 | Rork et al. |
| 2018/0032040 | A1 | 2/2018 | Sweet, III et al. |
| 2018/0322348 | A1 | 11/2018 | Sweet, III et al. |
| 2019/0073912 | A1 | 3/2019 | Mellinger, III et al. |
| 2019/0287413 | A1 | 9/2019 | Walton |
| 2019/0349426 | A1* | 11/2019 | Smith ................ H04L 67/562 |
| 2020/0267505 | A1 | 8/2020 | Mehran et al. |
| 2021/0306831 | A1* | 9/2021 | Seed ................ H04L 41/5041 |

FOREIGN PATENT DOCUMENTS

| | | |
|---|---|---|
| EP | 3462775 A1 | 4/2019 |
| GB | 2541236 A | 2/2017 |
| GB | 2566987 A | 4/2019 |
| KR | 20190106844 A | 9/2019 |

OTHER PUBLICATIONS

Minucci et al., F. Avoiding Collisions at Any (Low) Cost: ADS-B Like Position Broadcast for UAVs, IEEE Access, vol. 8, pp. 121843-121857. (Year: 2020).*
Chen H., et al., "A Survey of Autonomous Control for UAV," International Conference on Artificial Intelligence and Computational Intelligence, 2009, pp. 267-271.
Combined Search and Examination Report under Sections 17 and 18(3) for Great Britain Application No. 2016440.6, dated Apr. 15, 2021, 9 pages.
Examination Report under section 18(3) for GB Application No. 2016440.6, dated Dec. 9, 2021, 4 pages.
International Search Report and Written Opinion for International Application No. PCT/EP2021/075591, dated Mar. 4, 2022, 16 pages.
Invitation to Pay Additional Fees with Partial International Search for Application No. PCT/EP2021/075591 mailed Dec. 23, 2021, 11 pages.
Koyuncu E., et al., "Deployment and Trajectory Optimization for UAVs: A Quantization Theory Approach," IEEE Wireless Communications and Networking Conference (WCNC), 2018, 6 pages.
Li X., et al., "ABPP: An Adaptive Beacon Scheme for Geographic Routing in FANET," International Conference on Parallel and Distributed Computing, Applications and Technologies (PDCAT), 2017, pp. 293-299.
Notification of Transmittal of the International Preliminary Report on Patentability for Application No. PCT/EP2021/075591, dated Oct. 18, 2022, 11 pages.
Office Action received for Chinese Patent Application No. 202180064218.1, dated Sep. 8, 2023, 14 pages (7 pages of English Translation and 7 pages of Official Copy).
Peral-Rosado, et al., "Survey of Cellular Mobile Radio Localization Methods: From 1G to 5G", IEEE, Communications Surveys & Tutorials, vol. 20, No. 2, Second Quarter, 2018, pp. 1124-1148.
Koesdwiady, et al., "Recent Trends in Driver Safety Monitoring Systems: State of the Art and Challenges", IEEE Transactions on Vehicular Technology, vol. 66, No. 6, Jun. 2017, pp. 4550-4563.

* cited by examiner

UNMANNED AERIAL VEHICLE

PRIORITY CLAIM

The present application is a National Phase entry of PCT Application No. PCT/EP2021/075591, filed Sep. 17, 2021, which claims priority from GB Patent Application No. 2016440.6, filed Oct. 16, 2020, each of which is hereby fully incorporated herein by reference.

TECHNICAL FIELD

The present disclosure relates to an Unmanned Aerial Vehicle (UAV) in a wireless communications network.

BACKGROUND

An Unmanned Aerial Vehicle (UAV) is a vehicle configured for aerial movement through autonomous or remote control. UAVs have been implemented in wireless telecommunications networks as a form of mobile access point, such as a mobile base station in a cellular telecommunications network, to provide additional capacity to the wireless telecommunications network in locations where the fixed access points are overloaded. This may occur, for example, where there is a sudden, significant and temporary increase in the number of users where it would not be economical to upgrade the fixed access point(s) to accommodate the corresponding increase in demand, or when the fixed access point and/or its backhaul connection are temporarily compromised. UAVs have also been implemented as relay nodes in wireless telecommunications networks to improve coverage, or as a form of User Equipment (UE).

It is desirable for UAVs to avoid physical collisions with other objects, such as other UAVs in the wireless telecommunications network.

SUMMARY

According to a first aspect of the disclosure, there is provided a method of operating a network node to control a first Unmanned Aerial Vehicle, UAV, in a wireless telecommunications network, the method comprising: determining a collision risk for the first UAV; determining a reporting rate for the first UAV based on the collision risk; and sending a reporting rate update message to the first UAV so as to cause the first UAV to report its position at the determined reporting rate.

The wireless telecommunications network may include a second UAV, and the method may further comprise the steps of: receiving positioning data including the position of the first UAV; and receiving positioning data including the position of the second UAV, wherein the collision risk is based on a distance between the first UAV and the second UAV.

The collision risk may be based on misbehavior of the first UAV or another UAV in the wireless telecommunications network. The collision risk may be based on meteorological data.

The wireless telecommunications network may be a cellular telecommunications network.

According to a second aspect of the disclosure, there is provided a method of operating an Unmanned Aerial Vehicle, UAV, in a wireless telecommunications network, the method comprising receiving a reporting rate update message from a network node in the wireless telecommunications network, the reporting rate update message including a reporting rate; determining a position of the UAV; and sending a position report message to the network node at the reporting rate, the position report message including the determined position.

The position of the UAV may be determined based on either a UE-based or UE-assisted positioning mechanism.

According to a third aspect of the disclosure, there is provided a computer program comprising instructions which, when the program is executed by a computer, cause the computer to carry out the first or second aspect of the disclosure. The computer program may be stored on a computer readable carrier medium.

According to a fourth aspect of the disclosure, there is provided a network node for a wireless telecommunications network comprising a processor configured to carry out the steps of the first aspect of the disclosure. According to a fifth aspect of the disclosure, there is provided an Unmanned Aerial Vehicle, UAV, for a wireless telecommunications network comprising a processor configured to carry out the second aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION

Figure 1:
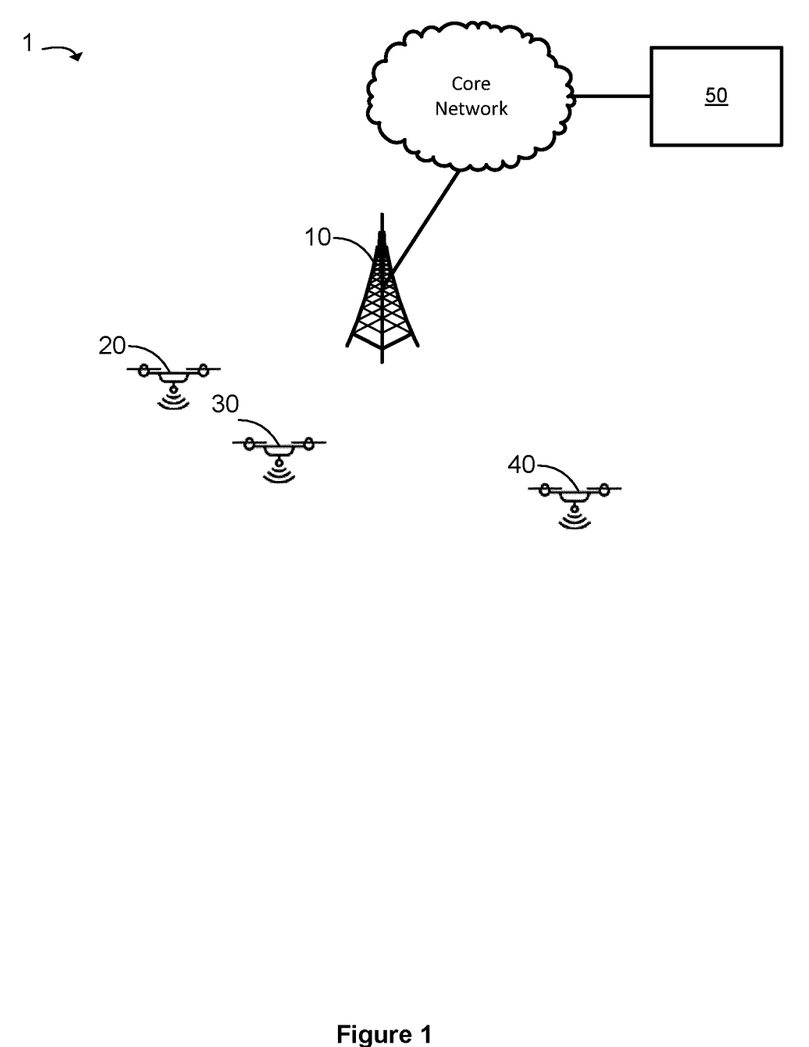
FIG. 1 is a schematic diagram of a cellular telecommunications network of a first embodiment of the present disclosure.

A cellular telecommunications network 1 of an embodiment of the present disclosure will now be described with reference to FIGS. 1 to 3. The cellular network 1 includes a terrestrial base station 10, a first mobile base station 20, a second mobile base station 30, a third mobile base station 40, and a location server 50 (connected to the first terrestrial base station 10 via the core network). The first, second and third mobile base stations 20, 30, 40 are Unmanned Aerial Vehicles (UAVs).

Figure 2:
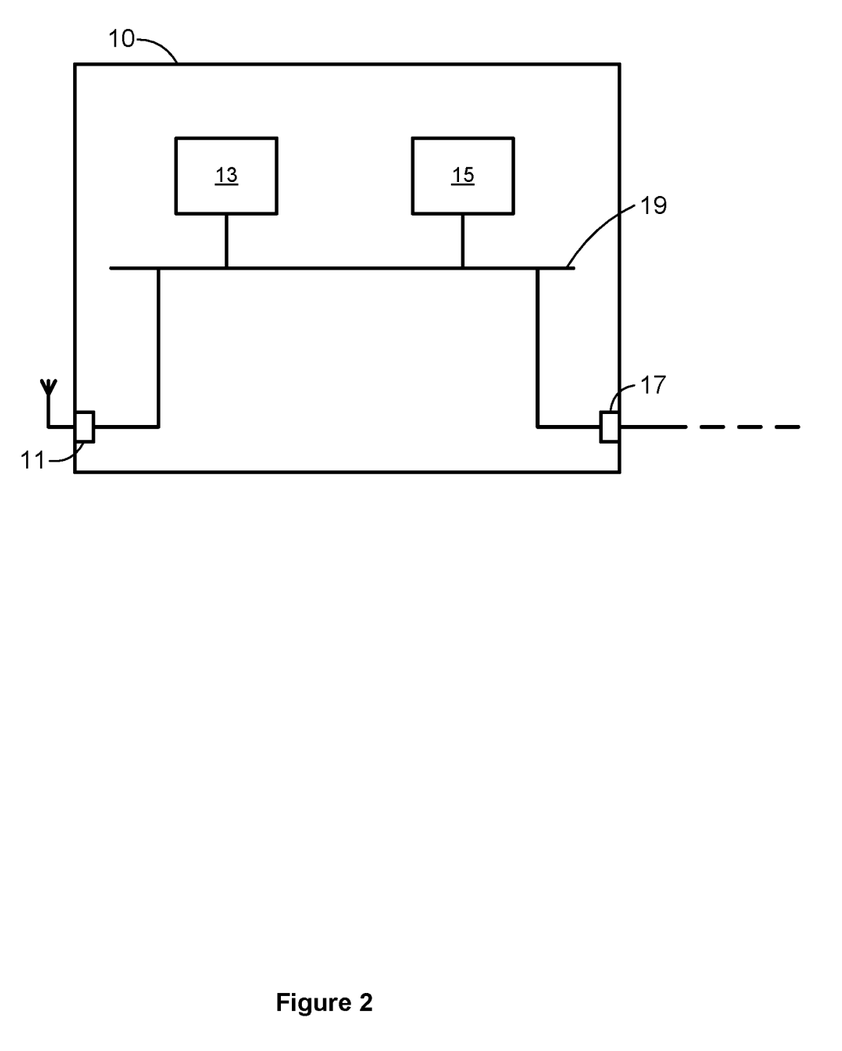
FIG. 2 is a schematic diagram of a first terrestrial base station of the network of FIG. 1.

The first terrestrial base station 10 is shown in more detail in FIG. 2. The first terrestrial base station 10 includes a first transceiver 11, a processor 13, memory 15, and a second transceiver 17, all connected via bus 19. In this embodiment, the first transceiver 11 is an antenna configured for wireless communications via the Long Term Evolution (LTE) protocol, and the second transceiver 17 is an optical fiber connection for wired communications with a core network and other base stations of the cellular telecommunications network 1. The first terrestrial base station 10 is configured to use the first transceiver 11 to communicate with User Equipment (UE) and/or to provide a donor connection to one or more of the first, second and third mobile base stations 20, 30, 40.

Figure 3:
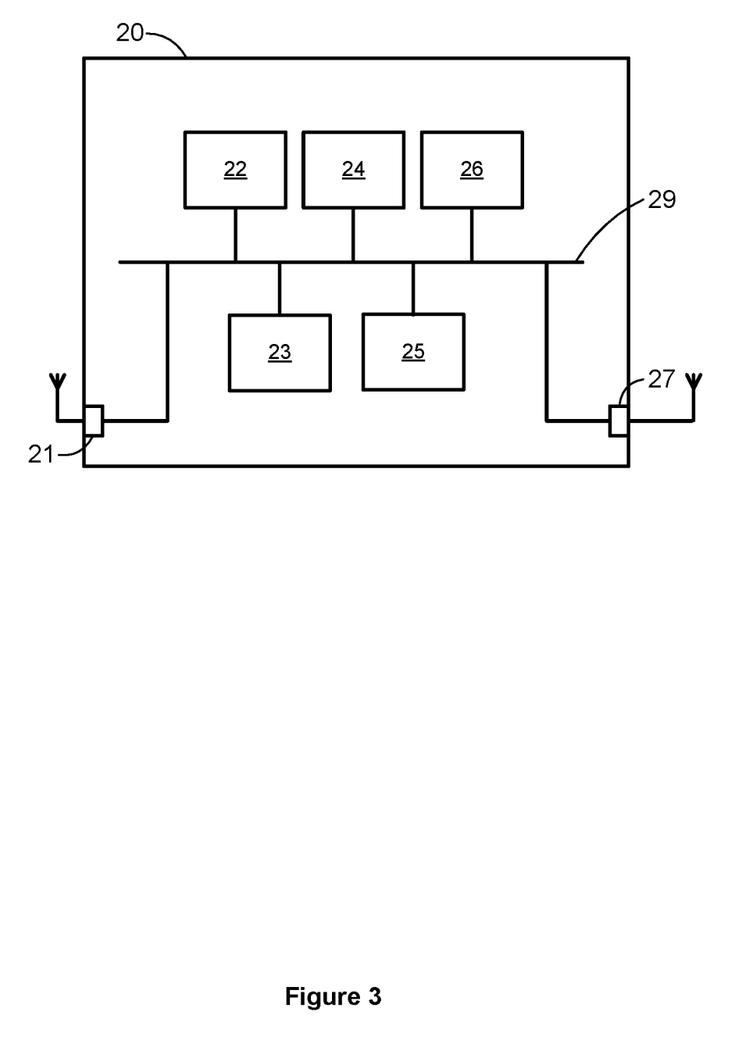
FIG. 3 is a schematic diagram of a first mobile base station of the network of FIG. 1.

The first mobile base station 20 is shown in more detail in FIG. 3 and includes a first communications interface 21, a processor 23, memory 25, and a second communications interface 27, all connected via bus 29. The first communications interface 21 is connected to an antenna for wireless communications with UE via the LTE protocol, and the second communications interface is also connected to an antenna for wireless communications with the core network via the donor connection to the first terrestrial base station 10. The first mobile base station 20 may therefore serve UE via its first transceiver 21, and any traffic associated with this UE may be transmitted between the UE and the core network via the first mobile base station 20 and the first terrestrial base station 10 (that is, the first terrestrial base station 10 acts as a "donor" base station for the first mobile base station 20).

In this embodiment, the first mobile base station 20 includes a plurality of rotors which allow the mobile base station 20 to generate lift, a plurality of actuators and sensors to control its flight (which operate under the control of an autonomous flight function of the processor 23), and a power supply. Furthermore, the mobile base station 20 includes a Global Navigation Satellite System (GNSS) module (in this embodiment a Global Positioning System (GPS) module 22), in order to determine its longitudinal and latitudinal position, a compass 24 to determine its bearing, and a Leddar-based optical altimeter 26 to determine its height. The positioning data (including longitudinal and latitudinal positioning data for the first mobile base station 20 captured by the GPS module 22 and height positioning data for the first mobile base station 20 captured by the altimeter 26) may be used as part of the autonomous flight function of the processor 23. Furthermore, in this embodiment, the first mobile base station 20 is configured to report this positioning data to the location server 50 at a configurable reporting rate (in which each report includes the most recently captured positioning data). This configurable reporting rate is described in more detail in the embodiment of the method of present disclosure, discussed below.

The second and third mobile base stations 30, 40 are substantially the same as the first mobile base station 20.

The first terrestrial base station 10 and the first, second and third mobile base stations 20, 30, 40 are all connected to the location server 50 via the core network. The location server 50 stores a database of (configurable) threshold distances and (configurable) reporting rates. These will also be described in more detail in the embodiment of the method of the present disclosure.

Figure 4:
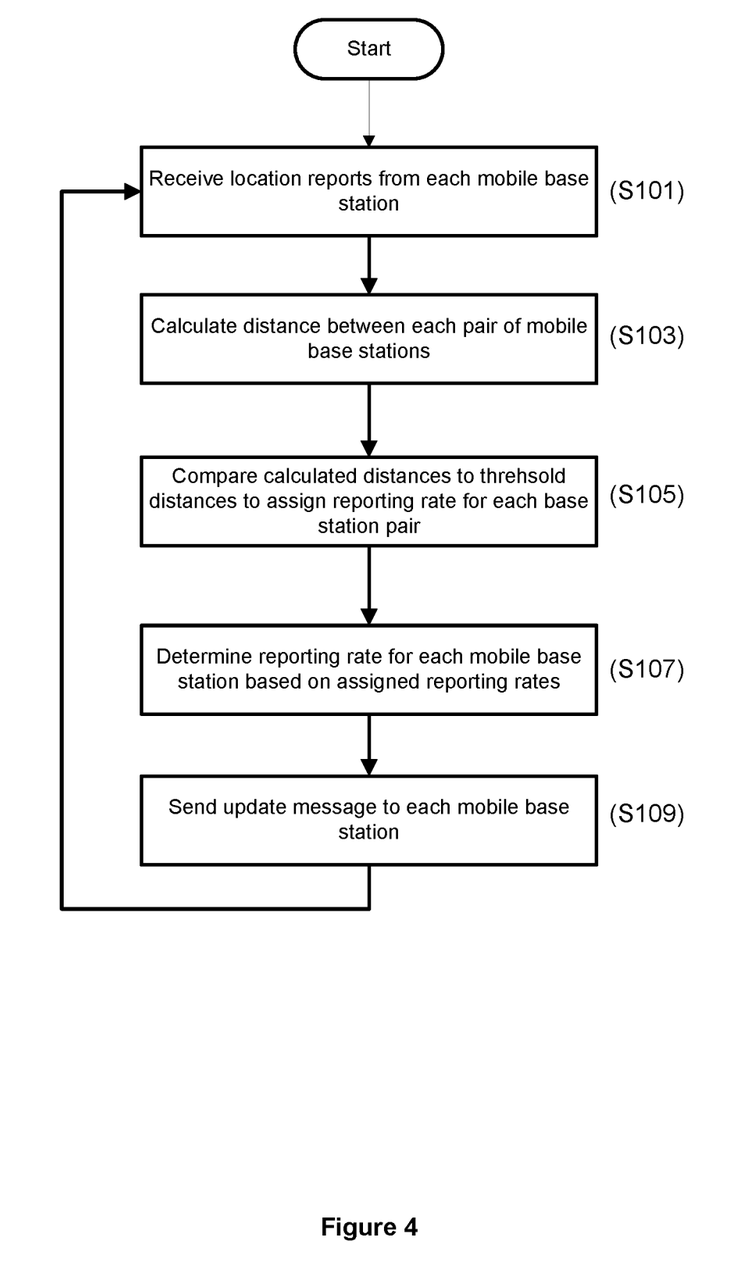
FIG. 4 is a flow diagram of a first process of a first embodiment of a method of the present disclosure.
Figure 5:
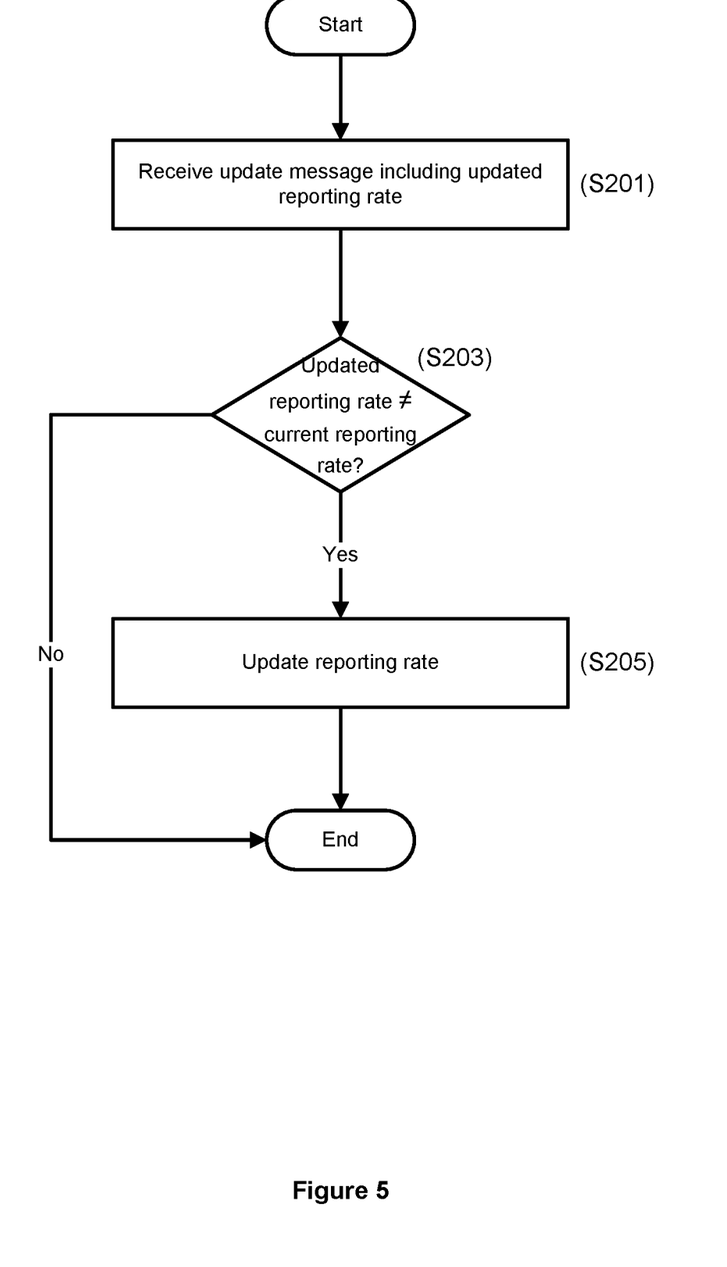
FIG. 5 is a flow diagram of a second process of the first embodiment of the method of FIG. 4.

A first embodiment of a method of the present disclosure will now be described with reference to FIGS. 4 to 5. In an initial state, the first, second and third mobile base stations 20, 30, 40 all use a first reporting rate, $R_1$ (i.e. a default reporting rate) for sending their respective location reports to the location server 50.

A first process of this first embodiment, implemented on the location server 50, will now be described. In S101, the location server 50 receives location reports from the first, second and third mobile base stations 20, 30, 40 at their respective reporting rates (in this initial state, the first reporting rate, $R_1$). As noted above, these location reports include longitudinal, latitudinal and height data for each mobile base station.

In S103, the location server 50 calculates a distance between each pair of mobile base stations based on the location reports. There are three unique base station pairs in this embodiment, being a first base station pair comprising the first mobile base station and second mobile base station 30, a second base station pair comprising the first mobile base station 20 and third mobile base station 40, and a third base station pair comprising the second mobile base station 30 and third mobile base station 40. Naturally, if the network included one or more further base stations, then there would be further base station pairs including those comprising one of the first, second or third mobile base station and one of the further base stations, and between pairs of further base stations. In this embodiment, the location server 50 therefore calculates a distance between the first mobile base station 20 and second mobile base station 30, $d_{12}$, a distance between the first mobile base station 20 and third mobile base station 40, di 3, and a distance between the second mobile base station 30 and third mobile base station 40, $d_{23}$.

In S105, the location server 50 compares these distances to the set of threshold distances (a first threshold distance $D_1$ and a second threshold distance $D_2$, where the first threshold distance $D_1$ is greater than the second threshold distance $D_2$) and applies the following logic:

If the distance between base station x and base station y, $d_{xy}$, is equal to or greater than the first threshold distance, $D_1$, then assign that base station pair a first reporting rate, $R_1$;

If the distance between base station x and base station y, $d_{xy}$, is less than the first threshold distance, $D_1$, but equal to or greater than the second threshold distance, $D_2$, then assign that base station pair a second reporting rate, $R_2$ (in which $R_2$ is a higher reporting rate than $R_1$);

If the distance between base station x and base station y, $d_{xy}$, is less than the second threshold distance, $D_2$, then assign that base station pair a third reporting rate, $R_3$ (in which $R_3$ is a higher reporting rate than $R_2$).

In S107, the location server 50 determines a reporting rate for each base station based on the assigned reporting rates associated with each base station. That is, as the logic of S105 is applied to the calculated distances between each base station pair, and base stations may be members of multiple base station pairs, then the location server 50 determines the reporting rate of each base station to be the greatest assigned reporting rate for all base station pairs that the base station is a member of. For example, if the assigned reporting rate for the distance between the first and second mobile base station 20, 30 is $R_2$ and the assigned reporting rate for the distance between the first and third mobile base station 20, 40 is $R_1$, then the location server 50 determines the reporting rate for the first mobile base station 20 to be $R_2$. In this embodiment, the location server 50 determines the reporting rate for the first mobile base station 20 to be $R_2$, the reporting rate for the second mobile base station 30 to be $R_2$, and the reporting rate for the third mobile base station 40 to be $R_1$.

In S109, the location server 50 sends an update message to each of the first, second and third mobile base station 20, 30, 40. The first process then loops back to S101, in which the location server 50 receives further location reports from the first, second and third mobile base station 20, 30, 40.

A second process of this first embodiment, which is implemented on the first, second and third mobile base stations 20, 30, 40, will now be described. For simplicity, the second process will be described from the perspective of the first mobile base station only. In S201, the first mobile base station 20 receives the update message from the location server (sent in S109 of the first process), instructing the first mobile base station 20 to update its reporting rate to $R_2$. In S203, the first mobile base station 20 determines whether the reporting rate in the update message is different to its current reporting rate. If not, then the second process ends. In this example, the reporting rate in the update message ($R_2$) is different to the current reporting rate ($R_1$) so the second process continues to S205 in which the first mobile base station's processor 23 reconfigures the first mobile base station's reporting rate to $R_2$. Following this update, the first mobile base station 20 sends location reports at its new reporting rate.

The first embodiment of the present disclosure provides the advantage of adjusting the location reporting rate of the UAV based on the distance between the UAV and any other UAV in the cellular communications network. This provides a balance between a desire for more frequent location reports from the UAV (to improve, for example, UAV collision avoidance mechanisms) and the desires for reduced battery consumption (required to capture the latest positioning data via the GPS module 22 and altimeter 26) and reduced control signaling (for reporting this data to the location server 50 for processing). Accordingly, this reporting rate is set based on a negative relationship with distance to any other UAV, so that energy consumption increases as the likelihood of a collision increases and vice versa.

In an enhancement to the above first embodiment, the location server 50 may also react with further messages to one or more of the mobile base stations, such as by sending an instruction to a mobile base station to alter its position or flight path, to delay take-off, or to instruct one mobile base station to cover a certain region instead of another mobile base station. These instructions may be calculated as a part of a collision avoidance mechanism.

In the above embodiment, the trigger for adjusting the reporting rate of a UAV is based on the distance from that UAV to other UAVs in the communications network. However, this is non-essential and the reporting rate may be adjusted based on another factor relating to collision risk. This factor may be, for example, that the UAV (or a nearby UAV) has been identified as misbehaving, such as by deviating unexpectedly from its position or flight path. In response, the location server may increase the reporting rates of the misbehaving UAV and/or any UAVs having a position or flight path corresponding with a region of the misbehaving UAV. To detect such misbehavior events, each UAV may share flight data with the location server 50 (e.g. start location, destination location, and flight path) so that the location server 50 may detect a misbehavior event. In another example, the factor relating to collision risk may be that the UAV is in a region of adverse weather conditions. The location server 50 may receive data identifying such regions from a meteorological database.

The collision risk may also be calculated based on any combination of the above factors, so as to define the collision risk of each UAV in the communications network according to a risk assessment algorithm (which may be configurable), and the reporting rate for each UAV may then be based on this calculated collision risk.

In the above embodiment, the UAV utilizes a GPS module for longitudinal and latitudinal data and a Leddar-based altimeter for height data. However, this is non-essential. For example, the height data may also be derived from the GPS module. Furthermore, the UAV may utilize other positioning mechanisms to determine its position, such as downlink Observed Time Difference Of Arrival (OTDOA), uplink OTDOA and enhanced cell-ID, by implementing the LTE Positioning Protocol in which the UAV is a Secure User Plane Location (SUPL) Enabled Terminal (SET). Furthermore, other positioning mechanisms that are derived from motion sensors (e.g. accelerometers) may be used. In this example, an absolute positioning mechanism (such as GPS) may be used initially to capture the UAV's location, and motion sensors may then be used to track the UAV's movement from this captured location. Still furthermore, a positioning mechanism based on a map matching solution may be used. In any one of these scenarios, the concepts of the first embodiment above may be utilized to provide a balance between the desire to capture up-to-date positioning data for collision avoidance mechanisms with the desires to reduce power consumption to capture the positioning data and to reduce control signaling for reporting this data.

The above embodiment relates to a UAV in a cellular telecommunications network. However, the skilled person will understand that the above embodiment applies to any form of wireless telecommunications network having a UAV capable of wireless communications in said wireless telecommunications network. Furthermore, it is non-essential that the UAV is acting as a mobile base station (or access point), as it may alternatively be acting as a relay node or User Equipment (UE).

The skilled person will understand that it is also non-essential that the first process is implemented on a location server. Alternatively, the first process may be implemented on an edge compute node that is configured to receive location reports from a plurality of UAV in the communications network.

In the above embodiment, the location server updates the reporting rate of each UAV in the communications network. However, this is non-essential and the location server may update the reporting rate of a subset of UAVs in the communications network. This may be the case, for example, where one UAV is operating in an emergency services mode (so as to provide additional coverage at the location of the emergency). As part of this emergency services mode the UAV may use a particular (e.g. maximum) reporting rate for reporting its positioning data, regardless of its distance to other UAVs.

The skilled person will understand that any combination of features is possible within the scope of the present disclosure, as claimed.

The invention claimed is:

1. A method of operating a network node to control a first Unmanned Aerial Vehicle (UAV) in a wireless telecommunications network, the method comprising:
   determining a collision risk for the first UAV;
   determining a reporting rate for the first UAV based on the collision risk; and
   sending a reporting rate update message to the first UAV so as to cause the first UAV to report a position at the determined reporting rate.

2. The method as claimed in claim 1, wherein the wireless telecommunications network includes a second UAV, and the method further comprises:
   receiving positioning data including the position of the first UAV; and
   receiving positioning data including a position of the second UAV,
wherein the collision risk is based on a distance between the position of the first UAV and the position of the second UAV.

3. The method as claimed in claim 1, wherein the collision risk is based on, at least, the first UAV or another UAV in the wireless telecommunications network unexpectedly deviating from a position or a flight path.

4. The method as claimed in claim 1, wherein the collision risk is based on, at least, meteorological data.

5. The method as claimed in claim 1, wherein the wireless telecommunications network is a cellular telecommunications network.

6. A non-transitory computer-readable carrier medium storing a computer program comprising instructions that, when the program is executed by a computer system, cause the computer system to carry out the method of claim 1.

7. A computer system comprising at least one processor and memory storing instructions to carry out the method of claim 1.

8. A network node for a wireless telecommunications network comprising a processor configured to carry out the method of claim 1.

9. A system comprising:
  the network node as claimed in claim 8; and
  an Unmanned Aerial Vehicle (UAV) comprising a processor configured to:
    receive the reporting rate update message from the network node,
    determine a position of the UAV, and
    send a position report message to the network node at the reporting rate, the position report message including the determined position.

10. The system as claimed in claim 9, wherein the processor determines the position of the UAV based on either a user equipment (UE)-based positioning mechanism or a UE-assisted positioning mechanism.

\* \* \* \* \*